United States Patent
Bondy et al.

(10) Patent No.: US 7,006,508 B2
(45) Date of Patent: Feb. 28, 2006

(54) COMMUNICATION NETWORK WITH A COLLECTION GATEWAY AND METHOD FOR PROVIDING SURVEILLANCE SERVICES

(75) Inventors: William M. Bondy, Buffalo Grove, IL (US); Wesley Stuart Jones, Palatine, IL (US); Shmuel Silverman, Buffalo Grove, IL (US); Bruce Martin Wiatrak, Bolingbrook, IL (US); Raymond M. Liss, St. Charles, IL (US); Timothy L. Moran, Argyle, TX (US); Howard Nodell, Buffalo Grove, IL (US); Robert Gerald Hug, Naperville, IL (US)

(73) Assignee: Motorola, Inc., Schaumburg, IL (US)

( * ) Notice: Subject to any disclaimer, the term of this patent is extended or adjusted under 35 U.S.C. 154(b) by 856 days.

(21) Appl. No.: 09/827,224

(22) Filed: Apr. 5, 2001

(65) Prior Publication Data

US 2002/0051518 A1 May 2, 2002

Related U.S. Application Data

(60) Provisional application No. 60/195,723, filed on Apr. 7, 2000.

(51) Int. Cl.
*H04L 9/00* (2006.01)
*H04L 12/26* (2006.01)
(52) U.S. Cl. .................. 370/410; 709/224; 713/201
(58) Field of Classification Search ........ 370/352–357, 370/389, 400, 401, 466, 467, 546, 259, 410; 379/112.01, 133–140, 33.01–32; 709/220, 709/224, 227, 249; 713/201
See application file for complete search history.

(56) References Cited

U.S. PATENT DOCUMENTS

| 4,056,684 | A | * | 11/1977 | Lindstrom | 370/381 |
|---|---|---|---|---|---|
| 5,590,171 | A | * | 12/1996 | Howe et al. | 379/33 |
| 5,701,293 | A | * | 12/1997 | Fujii | 370/244 |
| 5,796,942 | A | * | 8/1998 | Esbensen | 713/201 |
| 6,292,098 | B1 | * | 9/2001 | Ebata et al. | 370/235 |
| 6,549,613 | B1 | * | 4/2003 | Dikmen | 379/70 |
| 2001/0052081 | A1 | * | 12/2001 | McKibben et al. | 713/201 |
| 2002/0009973 | A1 | * | 1/2002 | Bondy et al. | 455/67.2 |

* cited by examiner

*Primary Examiner*—Melvin Marcelo (74) *Attorney, Agent, or Firm*—Steven May (57) ABSTRACT

A communication network (10) utilized for providing communications between a first party and a second party includes a surveillance server (26) within a core network (10) to provide communication surveillance capability. The core network (10) may be a packet data network, and the surveillance server (26) is operable responsive to trigger information to establish communications surveillance. Communication surveillance may be established by creating duplicate bearer packets of those data packets carrying the communicated data between the parties, creating duplicate control packets of those data packets carrying in-band or out-of-band call control information between the parties and within the packet data network, and/or various combinations thereof. The duplicate bearer packets and the duplicate control packets are routed to appropriate authorized law enforcement agencies for providing surveillance.

17 Claims, 7 Drawing Sheets

COMMUNICATION NETWORK WITH A COLLECTION GATEWAY AND METHOD FOR PROVIDING SURVEILLANCE SERVICES

CROSS-REFERENCE TO RELATED APPLICATION

This application is based on prior U.S. patent application Ser. No. 60/195,723, filed Apr. 7, 2000, and priority thereto is hereby claimed.

FIELD OF THE INVENTION

The present invention relates generally to communication networks, and more particularly, to a communication network, an apparatus and a method for providing surveillance services.

BACKGROUND OF THE INVENTION

Under certain circumstances, and with appropriate authorization, law enforcement agencies (LEA) are permitted to legally intercept and monitor communications between individuals that may be targets of an investigation. A common technique, known as wiretapping, involves intercepting telephonic communications between individuals by "tapping" into the communication.

Plain old telephone systems (POTS) and early wireless communication systems incorporating, Class 4 or Class 5 exchanges, a Mobile Switching Center (MSC) and the like, employ circuit switching techniques to connect a calling party to a called party via a communication network. The call is completed upon successfully establishing the circuit between the parties, and the circuit becomes a dedicated link between the parties for carrying on the telephonic communications. All voice communication between the parties is then carried on this circuit.

To provide surveillance, or wiretapping, in such circuit switched systems required only determining and "tapping" the circuit at an appropriate location along the circuit. A circuit is dedicated to the call, and because all of the communications are carried on this circuit, the LEA can be assured of intercepting the entire communication, including in-band and out-of-band call signaling, between the individuals under surveillance from this one tap.

Evolution of communications technology will render obsolete the circuit switched network for both voice and data communication networks. In fact, circuit switched networks are being replaced by packet-based communication networks. In packet-based networks, the information carried by the network, for example data or encoded voice, is organized into packets, and the network carries these packets from the sending party to the receiving party. Within the network there is no single path or "circuit" that carries the packets from the sending party to the receiving party. Instead, the network may be considered a fabric of links, switches and routers that carry packets in an efficient manner. Packets associated with the communications of a first party with a second party may travel on any number of paths. This arrangement of the packet based communication network permits more efficient utilization of communication resources, and hence, permits the communication network to carry more information, with greater stability. Thus, the packet based communication network can service a greater number of users communicating greater amounts of information, i.e., both voice and data.

The Communications Assistance for Law Enforcement Act of 1994 (CALEA) requires that all US based wireline, cellular and broadband personal communication services (PCS) carriers provide the capability of legal, undetectable, bearer and call signaling intercept to law enforcement agencies for any subscriber utilizing their network. CALEA implementation, which is governed by Federal Communication Commission (FCC) regulations, must be completed by Jun. 30, 2000 for non-packet-based networks and by Sep. 30, 2001 for packet-based networks. While the FCC has specified the required functionality, it has not specified or recommended architecture for achieving compliance with its regulations.

As described above in connection with circuit-based, or non-packet-based networks, providing surveillance capability generally requires only determining the particular circuit established for a communication, and intercepting both the bearer and call signaling information carried on that circuit. However, in packet-based networks no single circuit or path carries the data packets which include the bearer and call signaling information. To ensure complete surveillance, it is necessary to ensure that all packets associated with a communication are identified regardless of the path assigned to any particular packet.

Additionally, the FCC regulations specify certain functional requirements beyond bearer and call signaling intercept that must be met for compliance with the CALEA legislation. The regulations are completely set forth in the interim standard J-STD-025, available from the Federal Communication Commission, 445 $12^{th}$ Street S.W., Washington, D.C., 20554. Among these requirements are a capability to provide: content of subject-initiated conference calls, party hold, join, drop on conference call, in-band and out-of-band signaling, timing information, dialed digit extraction, and no interruption of call performance, billing, etc. as a result of CALEA implementation.

Thus, there is a need for a communication network and method that includes surveillance capability and which utilizes packet switched data techniques for providing communication services.

DETAILED DESCRIPTION OF THE PREFERRED EMBODIMENTS

In accordance with the preferred embodiments of the invention, a communication network utilized for providing communications between a first party and a second party includes a surveillance server within a core network to provide communication surveillance capability. The core network may be a packet data network, and the surveillance server is operable responsive to trigger information to establish communications surveillance. Communication surveillance may be established by creating duplicate bearer packets of those data packets carrying the communicated data between the parties, creating duplicate control packets of those data packets carrying in-band or out-of-band call control information between the parties and within the packet data network, and/or various combinations thereof. The duplicate bearer packets and the duplicate control packets are routed to appropriate authorized law enforcement agencies for providing surveillance. Since these bearer packets are digitally encoded, the law enforcement agency will require encoding information on the bearer stream so that the packets can be decoded. Therefore, bearer packet encoding information must be sent to the law enforcement agency prior to initiating the duplication of bearer packets.

Consistent with the preferred embodiments of the present invention, the surveillance server (e.g., feature server) may be disposed within a packet data network and apart from external networks accessing the core network, the surveillance server may be associated with one or more network access servers and/or the surveillance server may be associated with one or more of the external accessing networks.

In accordance with preferred methods of providing surveillance within a packet data network, a surveillance server is provided either associated with or apart from the core network and in communication with the core network. The surveillance server identifies a trigger event, and responsive to the trigger event, causes the creation of duplicate bearer packets and/or duplicate control packets, and routes the duplicate packets to appropriate authorized law enforcement agencies.

Figure 1:
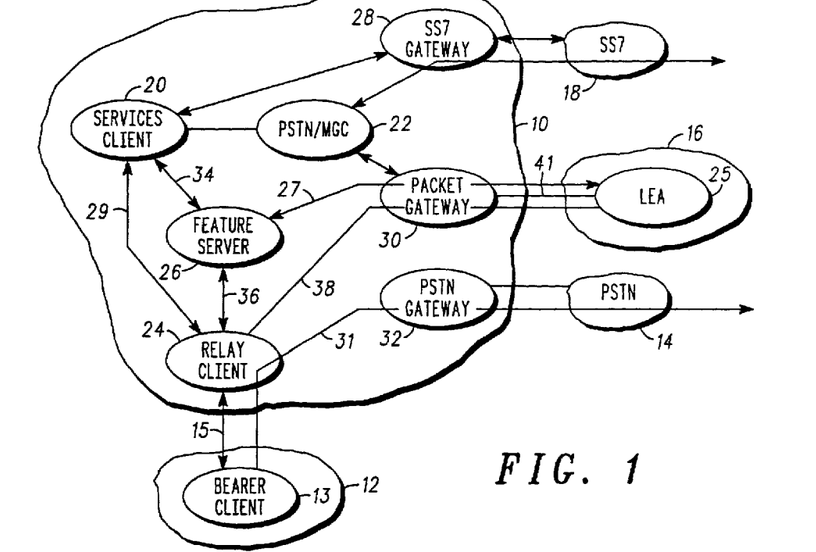
FIG. 1 is a block diagram illustration of a communication network in accordance with a preferred embodiment of the present invention.

With reference to FIG. 1, a communication core network is coupled for communication with a radio access network 12, a public switch telephone network (PSTN) 14, a packet data network and/or the Internet 16, and a Signaling System 7 (SS7) network 18. It should be appreciated that the core network 10 may be coupled, via gateways (e.g., an SS7 Gateway 28, a packet gateway 30 or a PSTN gateway 32), for communication to additional networks of operating under virtually any protocol.

Within the core network 10 are a number of elements including a services client 20, a PSTN/MGC 22, a relay client 24, and a CALEA feature server 26. The relay client 24 provides an interface between the core network 10 and the radio access network 12 for providing wireless communication services to subscribers, not shown, utilizing the radio access network 12 for wireless voice and data communications. Within the radio access network 12, a bearer client 13 provides the communication services to the subscribers, and is interfaced, such as by interface 15, to the relay client 14. Interface 15 is an ATM or IP signaling interface that relays radio access network signaling, possibly H.323, SIP, IS-634, or others, to the Services Client 20.

Additionally, a SS7 gateway 28 couples the core network 10 to the SS7 network 18, a packet gateway 30 couples the core network 10 to the Internet 16 and a PSTN gateway 32 couples the core network 10 to the PSTN 14. The convention used in FIG. 1 and throughout the drawings is that arrowed lines denote signaling information while non-arrowed lines denote bearer information.

The CALEA feature server 26 provides the CALEA feature application within the core network 10. The CALEA feature server 26 interfaces to the services client 20 via a hypertext transfer protocol (HTTP) or other text based applications programming interface (HTTP/text API) 34. The CALEA feature server 26 further interfaces with the relay client 24 via a feature application programming interface (FAPI) 36 to control duplication of bearer streams and processing of in-band signaling in the duplicated bearer streams. Additionally, the CALEA feature server 26 interfaces with the law enforcement agency (LEA) 25 via GEN-MAP link 27, for providing out-of-band call signaling information such as dialed digits, call-waiting invocation, call feature invocation, conferencing adds/drops/etc. GEN-MAP, as is known in the art, generally refers to an ANSI-41, GSM MAP or similar signaling protocol.

The services client 20 provides the call processing engine within the core network 10 for providing communication services to users of the core network 10. The services client 20 maintains the call model and state for subscribers in the radio access network 12.

In accordance with the preferred embodiments of the invention and upon invocation of CALEA services for a targeted subscriber(s), the services client 20 provides point-in-call (PIC) call signaling information to the CALEA feature server via the interface 34. This interface is a text based API such as HTTP or a more advanced API for feature processing. Additionally, the services client 20 interfaces with the relay client using a Relay Client Control Protocol (RCCP) connection 29 (based on H.248 signaling or MGCP) to manage the original bearer streams 31 pertaining to a subscriber's service requests.

The relay client 24 provides management of bearer streams 31, i.e., encoded voice or data, for active calls and/or conferences in the core network 10. In accordance with the preferred embodiments of the invention, the relay client 24 provides a capability to generate duplicate bearer streams 38 for communication to a LEA upon request from the CALEA feature server 26. Such duplicate bearer streams may be a single combined stream (full-duplex for a two party call and possibly all members of a conference call), or the relay client 24 may duplicate and provide all or a sub-set of all of the bearer streams 31 to the LEA 25, as requested by the LEA 25. Additionally, and in accordance with the preferred embodiments of the invention, the relay client 24 may also provide call signaling information in-band with the duplicate bearer stream 38, may exclude such call signaling information from the duplicate bearer stream or may provide the call signaling information as a separate data stream.

In accordance with the preferred embodiment of the invention shown in FIG. 1, the CALEA function resides within the CALEA feature server 26, which provides surveillance services within the core network 10 as a subscribed service. The service is authorized and activated under the guidance of the requesting LEA. The CALEA feature server 26 controls the relay client 24 via the xGCP link 36 (xGCP refers to the family of protocols SGCP, MGCP, and in the future MEGACO/H.248) to cause the relay client 24 to provide the duplicate bearer streams 38 to the LEA 25 via the packet gateway 30 and the packet data network 16 in a manner that is unobtrusive to the original streams. The CALEA feature server 26 also controls the relay client 24 via the xGCP link 36 to provide any required in-band signaling for the duplicate bearer streams 38. The CALEA feature server 26 is triggered from the services client 20 via link 34 at required PICs to provide the required out-of-band signaling information to the LEA 25 over the GENMAP link 27.

A basic surveillance services flow that may be applied with the preferred embodiment of the invention shown in FIG. 1 may start with CALEA service logic being downloaded to the services client 20 when a "targeted" subscriber registers with the core network 10. This logic download provides the services client 20 with access to the CALEA feature server 26 for the targeted subscriber.

The CALEA service logic may include the necessary triggers, and will include at least one trigger, and provides the LEA 25 with required call signaling information (dialed digits, service invocation, etc.) and proper instructions for generating the duplicate bearer streams 38. Upon detection of the at least one trigger associated with the targeted subscriber, such as registration, call origination, call termination, service invocation (e.g., call waiting, conference call, call forwarding, message retrieval, etc.) the services client 20 call model implements the surveillance service logic, which, in turn, interfaces with the CALEA feature server 26. The CALEA feature server 26, in turn, interfaces with the relay client 24 to provide the duplicate bearer streams 38 (e.g., merged, individual or sub-set bearer streams) to the LEA 25 using RTP over a secure Internet connection (such as defined in IPSec of the Internet Engineering Task Force) through the packet gateway 30. The CALEA feature server 26 forwards the requested signaling streams to the LEA 25 using the GENMAP link 27 over the IPSec through the packet gateway 30. Importantly, the original call signaling and bearer streams 31 are unaffected. The relay client 24 becomes the anchor point for targeted subscribers engaged in active calls. Also, core path optimization is deactivated if the call hands-off to another core network.

Figure 2:
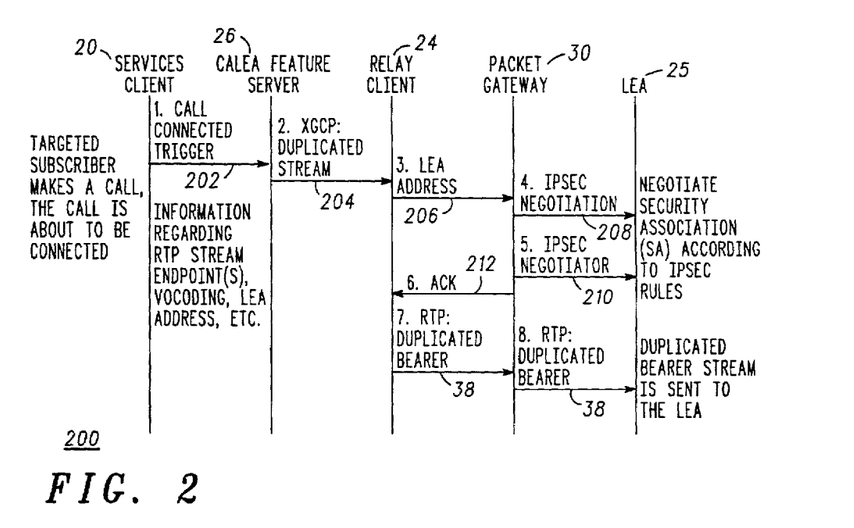
FIG. 2 is a call flow diagram illustrating a method of surveillance in a packet data network in accordance with a preferred embodiment of the present invention.

A representative call flow 200 for the system shown in FIG. 1, is illustrated in FIG. 2, wherein like reference numerals are used to represent like processes. FIG. 2 represents a surveillance service wherein the bearer streams are duplicated for forwarding to the LEA 25. Not shown, is an initial request by the LEA 25, via the packet gateway 30 for surveillance services in connection with a particular subscriber. This request contains the surveillance type information, which may be retained within the CALEA feature server 26, or as described in connection with alternate preferred embodiments of the invention, in other suitable locations within the core network 10.

As shown in FIG. 2, the targeted subscriber originates a call and the call is about to be connected. The services client 20 forwards a call connect trigger 202 to the CALEA feature server 26. The call connect trigger 202 includes information necessary for implementing the requested surveillance service, and may include the RTP stream endpoint(s), vocoder type, requesting LEA identification, requesting LEA address, and the like. The CALEA feature server 26 forwards a duplicate bearer stream signal 204 using the xGCP link 26 to the relay client 24, and the relay client 24 forwards the LEA address information 206 to the packet gateway 30.

The packet gateway 30 makes an IPSec negotiation request 208 to the requesting LEA 25 via an unsecured link 41. The security association is negotiated according to IPSec rules, and the LEA 25 provides an IPSec negotiation response 210. The packet gateway 30 sends an acknowledgement 212 of the IPSec negotiation to the relay client 24, and the relay client 24 begins sending the duplicate bearer streams 38, using RTP. The duplicate bearer streams are then communicated from the packet gateway 30 to the LEA 25 using the negotiated secure connection.

One of ordinary skill in the art will appreciate the modifications necessary to the above-described call flow 200 for triggering surveillance services responsive to call termination, services invocation, and other similar events occurring within the communication network 700.

Figure 3:
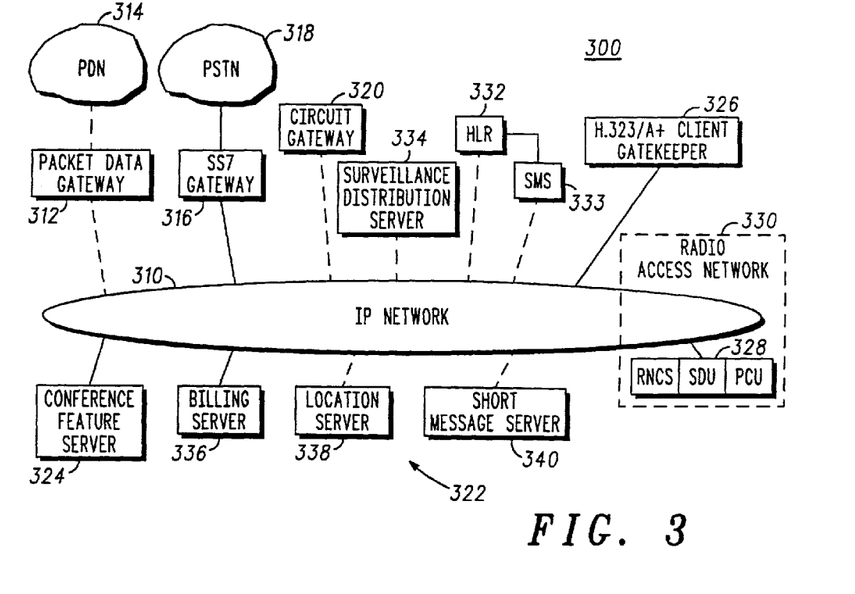
FIG. 3 is a block diagram illustration of a communication network in accordance with another preferred embodiment of the present invention.

FIG. 3 shows a communication network 300 in accordance with an alternate preferred embodiment of the invention. The communication network 300 includes a packet-based core network 310, and takes advantage of the distributed nature of the core network 310 for providing surveillance services. In accordance with the preferred embodiments of the invention, the communication network 300 makes use of several functional elements that are typical of and therefore expected to be resident within the core network 310 for providing communication services. Advantageously, the architecture of communication network 300 minimizes additional development that would otherwise be required to provide functions necessary to support surveillance services within the communication network 300.

The core network 310 includes a packet data gateway 312 for linking to a packet data network 314, an SS7 gateway 316 for linking to a PSTN 318, a circuit gateway 320, additional feature servers 322, a conference feature server 324, a H.323/A+ Client Gatekeeper 326, and an access server 328. Subscribers (not shown) access the core network 310 via an access network 330, such as a radio access network, and the access server 328. The core network 310 further includes a subscriber services database 332, e.g., a home location register database as is well known in cellular communication systems. As shown in FIG. 3, additional feature servers 322 may include a billing server 336, a location server 338 and a short message server 340.

As shown in FIG. 3, core network 310 also includes a surveillance distribution server (SDS) 334. As will be described in more detail below, the SDS 334 may provide the following functions: conversion of call set-up messages and call-related information to a standard message format, for example, to the J-STD-025 message standard, for communication to a requesting LEA; delivery of the standard messages to the LEA; initiation of requests to the core network elements to provide subscriber information, for example, location information; reception of packet data from other core network elements for communication to the LEA, and support a subscriber surveillance database.

To support the functionality of the SDS 334, it may be necessary to interface the SDS 334 with the H.323/A+ Client gatekeeper 326 and one or more of the feature servers 322, such as location server 338. The implementation shown in FIG. 3 does utilize and rely upon the conference feature server 324 being within or interfaced to the core network 310 to handle combining data from the surveillance subject and associate for delivery to the LEA. A conference feature server 324 will typically exist within the core network 310 for supporting POTS features, such as three-way calling, call forwarding, etc.; however, it will also be appreciated that the function of the conference feature server 324 may be provided within one of the additional feature servers 322, another element of the core network 310 or may be extracted from the core network 310.

It will also be appreciated that there may be several locations within the core network 310 within which subscriber surveillance data may be retained. However, adaptation of the home location register (HLR) to include a data structure for retaining the subscriber surveillance data advantageously reduces the amount of provisioning required for implementing surveillance services and provides an implementation cost savings. For purposes of the implementation shown in FIG. 3, it will be assumed that the HLR is utilized in this manner and accessed via the subscriber services management system 333 that is used for provisioning. The surveillance data that may be included in the subscriber services database 332 is wire tap type, start date and time, stop date and time, IP addresses for the requesting LEAs, case identifications, and LEA identification information.

In accordance with the embodiment of the invention shown in FIG. 3, responsive to invocation of surveillance services, the SDS 334 instructs the access server 328 to generate duplicate bearer data packets and to transmit the duplicate bearer data packets to the conference feature server 324. The conference feature server 324 combines and sums the duplicate bearer data packets into a single path and communicates them to the circuit gateway 320 to transmit to the requesting LEA (not depicted). The circuit gateway communicates to the SDS 334 the circuit or circuits being used to transmit the bearer data to the LEA, and the SDS 334 also provides this information to the LEA.

The H.323 Client gatekeeper 326 detects when a call set-up message is being transmitted by a targeted subscriber within the access network 330. The H.323 Client gatekeeper 326 transmits duplicate call set-up messages to the SDS 334, and the SDS 334 translates these messages into standard messages for communication to the LEA. The H.323 Client gatekeeper 326 will also transmit messages to the SDS 334 from other elements of the core network 310. For example, messages relating to the utilization of the feature servers 322 may be transmitted, or the subscriber services database 332 may transmit messages that the targeted subscriber has made changes to their feature profile. Additionally, the subscriber services database 332 will also inform the SDS 334 whenever the targeted subscriber has roamed into a different network.

By providing an interface to the billing server, the SDS 334 may obtain and retain billing records whenever surveillance services are provided to a LEA. Thus, the communication network operator may more accurately recoup the cost of providing surveillance services.

Surveillance services relating to short message data may be handled by either of the access server 328 or the H.323 Client gatekeeper 326 eliminating the need to interface the short message server 340 to the SDS 334. Whether the access server 328 or the H.323 Client gatekeeper 326 controls the transmission of short message data and information may depend on whether the short message data and information is considered bearer data or signaling data.

Figure 4:
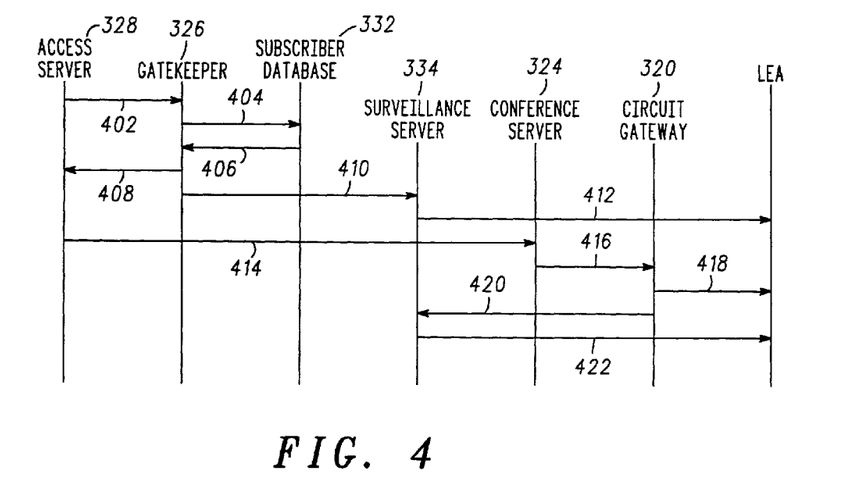
FIG. 4 is a call flow diagram illustrating a method of surveillance in a packet data network such as illustrated in FIG. 3.

FIG. 4 illustrates a typical call flow 400 wherein surveillance services are provided using a network configured as shown in FIG. 3. At step 402, the targeted subscriber originates a communication, for example, by dialing digits and pressing send on a cellular radiotelephone. At step 404, the H.323 Client gatekeeper 326 makes an inquiry of the subscriber services database 332, and at step 406 the surveillance services data is obtained from the subscriber services database and communicated to the H.323 Client gatekeeper 326. From the H.323 Client gatekeeper 326, at step 408, the surveillance services data is communicated to the access server 328. Alternatively, the access server 328 may maintain a separate, local surveillance services database.

At step 410, the H.323 Client gatekeeper 326 continues with the targeted subscriber's origination request, and transmits a copy of the origination data to the SDS 334. The SDS 334 receives the origination data and translates the data to the standard data format and transmits the translated origination data to the requesting LEA through the packet gateway 312, step 412. Once the origination attempt is answered at the far end, and bearer data, either voice or data, is sent between the targeted subscriber and the access server 328, at step 414, the access server 328 duplicates the bearer data and sends it to the conference feature server 324. The access server 328 must send duplicated bearer data for each LEA requesting surveillance services for the subject. That is, multiple LEAs may be requesting surveillance services on the same targeted subscriber, and therefore multiple duplicate copies of the bearer data will be generated, one each for each requesting LEA.

The conference feature server 324 assigns resources to combine and transmit the duplicated bearer data to each of the requesting LEAs, and the combined data is then sent to the circuit gateway for transmission to the LEAs, step 416. At step 418, the circuit gateway transmits the combined data to the LEAs, and at step 420 the circuit gateway transmits circuit identification data to the SDS 334 for reporting to the LEAs in standard messages, step 422.

The SDS 334 may also request location data from the location server 338. The location data is likewise placed into the standard message format by the SDS 334 and transmitted to the LEAs. Likewise, one of ordinary skill in the art will readily appreciate and understand the modifications necessary to the above-described call flow for providing surveillance services triggered from call termination, services invocation, and other similar events occurring within the communication network 300.

Figure 5:
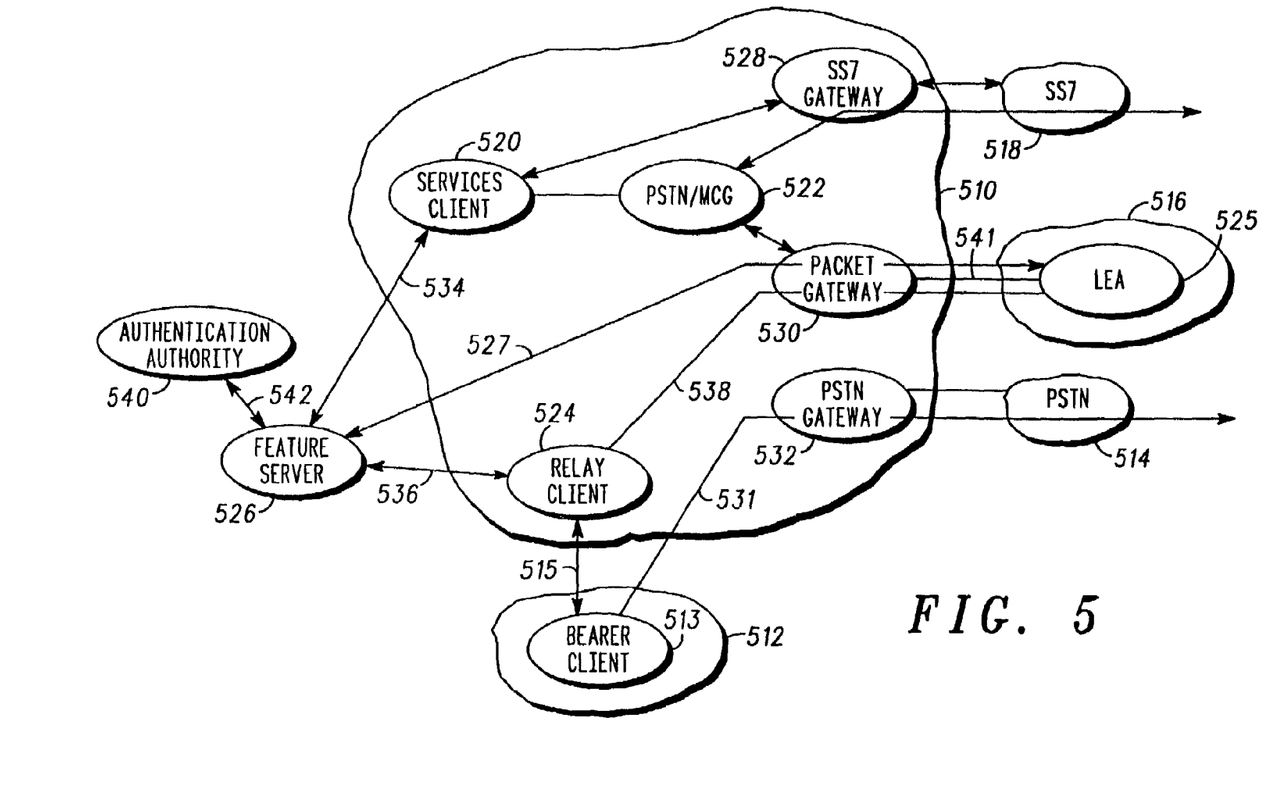
FIG. 5 is a block diagram illustration of a communication network in accordance with yet another preferred embodiment of the present invention.

FIG. 5 illustrates a communication network 500 similar in configuration to that shown in FIG. 1, and like elements are identified using a reference numeral beginning with the number "5." For example, core network 10, in FIG. 1, is shown as core network 510 in FIG. 5. In FIG. 5, the CALEA feature server 526 is no longer resident within the core network 510, but instead is disposed external to the core network 510. In this arrangement it is necessary to interface the CALEA feature server 526 to the services client 520, the relay client 524 and the packet gateway 530. Additionally, as shown in FIG. 5, the CALEA feature server 526 communicates via a link 542 with an authentication authority 540, for example, a designated governmental authority, which can authenticate requests for surveillance services.

In a preferred embodiment of the invention, and in connection with the communication network 500, a LEA 525 requests surveillance services for a targeted subscriber over an IPSec secure connection via the packet gateway 530. The services request is communicated through the core network 510 to the CALEA feature server 526. The CALEA feature server 526 engages in a dialogue with the authentication authority 540, and is provided all necessary information associated with the requested surveillance. The CALEA feature server 526 communicates with the appropriate network operator, for example, the operator of core network 510, authorizing the surveillance request and placing the surveillance order.

The CALEA feature server 526 may then inject logic into the appropriate network elements within core network 510, for example relay client 524, services client 520 and/or other feature servers and gateways, to enable the requested surveillance services.

When the targeted subscriber initiates a service that triggers surveillance, for example, originating a call, the relay client 524 notifies the CALEA feature server 526, and the network elements within the core network 510 provide the CALEA feature server 526 with the necessary surveillance data, for example, location. The relay client 524 also advises the assigned resource ID to be used for subscriber initiated service.

The CALEA feature server 526 instructs the relay client 524 to provide a duplicate bearer stream to the authorized LEA 525, using the LEA's IP address information provided when the LEA 525 made the surveillance services request. Alternatively, the CALEA feature server 526 could request the multicast address currently being used for the target subscriber and instruct the packet gateway 530 to send multicast information to the LEA's IP address. The relay client 524 routes the duplicate bearer stream to the LEA via the packet gateway 530 (and/or a circuit gateway). Other feature servers within the core network 510 are also instructed to route call signaling, short message data, and the like to the LEA 525 via the packet gateway 530 and using the LEA's IP address.

As is appreciated from the embodiment of the invention describe in connection with FIG. 5, surveillance services may be provided as an extracted feature. Thus, surveillance services may be added without extensive reconfiguration of the architecture of the core network 510. Providing authentication via the authentication authority 540 ensures that surveillance services are not implemented absent appropriate authorization. Moreover, in accordance with the embodiment of the invention shown in FIG. 5, surveillance services may be implemented using existing customer equipment.

Figure 6:
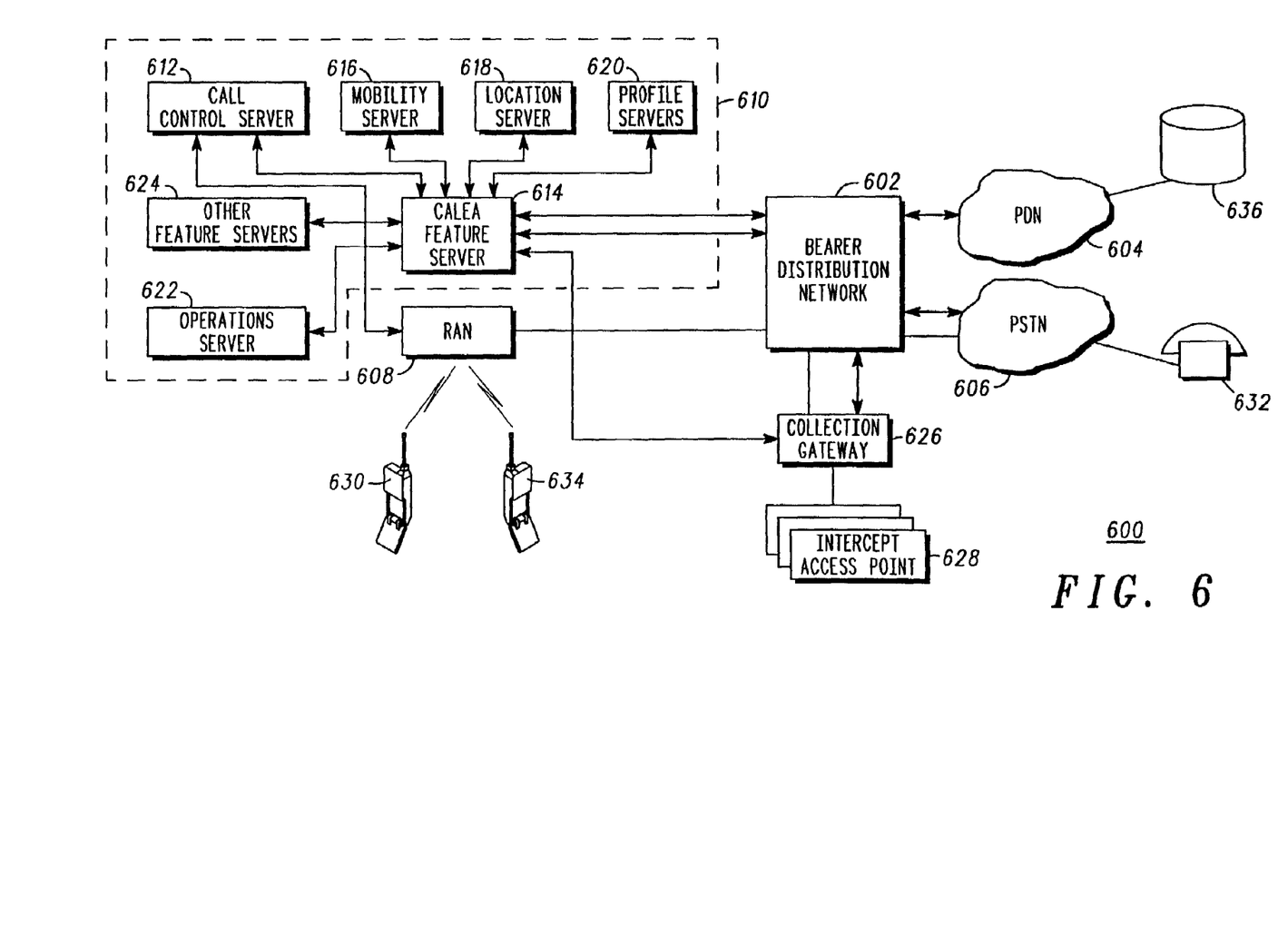
FIG. 6 is a block diagram illustration of a communication network in accordance with still another preferred embodiment of the present invention.

FIG. 6 illustrates a communication system 600 in accordance with another preferred embodiment of the invention. As in the previously described embodiments of the invention, signaling information is indicated by arrowed lines while bearer traffic is indicated by solid lines. The system 600 includes a bearer distribution network 602 that is coupled to a packet data network 604 and to a PSTN 606. The communication system 600 also includes a radio access network 608 and a core network 610.

The bearer distribution network 602 functions to transport IP bearer traffic (e.g. voice or data) within the communication network 600. For example, the bearer distribution network may include SDUs, MCUs, IP switches and signaling and media gateways. It should be appreciated that various combinations of these elements may be used depending on the type of source and destination parties/devices and the services provided. For example, in communication systems supporting mobile-to-mobile calling and/or packet data calling services, network resources may not be required.

The radio access network 608 is coupled to both the bearer distribution network 602 and to the core network 610 and provides wide-area wireless communication services in accordance with one or more communication standards. More particularly, within the core network 610, the radio access network is coupled to a call control server 612. The control server 612 is a functional entity within the core network 610 that incorporates the IP network call/session establishment and feature interaction. This is a distillation of such functions as radio network controller, services client, session manager, and the like. The call control server 612 is also coupled to a CALEA feature server 614 within the core network 610.

A mobility server 616, a location server 618, a profile server(s) 620, an operations server 622 and other feature servers 624 are provided within the core network 610 and are coupled to the CALEA feature server 614. The mobility server 616 is the functional equivalent of the Visitor Location Register (VLR) of current cellular communication systems. The location server 618 manages the locations gathering and provides the best possible coordinate location of mobile subscribers operating in the radio access network 608. The profile server 620 is a repository of mobile subscribers require for feature management and control. A home location register (HLR) is an example of a profile server 620. The operations server 622 provides the functionality and operations necessary to provision the CALEA feature server 614 with information required for providing surveillance services. For example, the operations server 622 will provide the CALEA feature server 614 with the identity of the surveillance target as well as the identity of the LEA requesting the surveillance services.

The bearer distribution network is also coupled to a collection gateway 626. The collection gateway 626 is a media gateway, which has an interface to law enforcement. It may also include functionality to encrypt/decrypt intercept signaling and bearer data, and may also contain multicast group client capability for intercepting multicast subject content. The collection gateway 626 interfaces to an intercept access point 628, which is the collection point for surveillance content and data, and the point from which the LEAs access and acquire the surveillance content and data.

With reference still to FIG. 6, and reference also to FIGS. 7–10, the operation of the communication system 600 for providing surveillance services is described.

Figure 7:
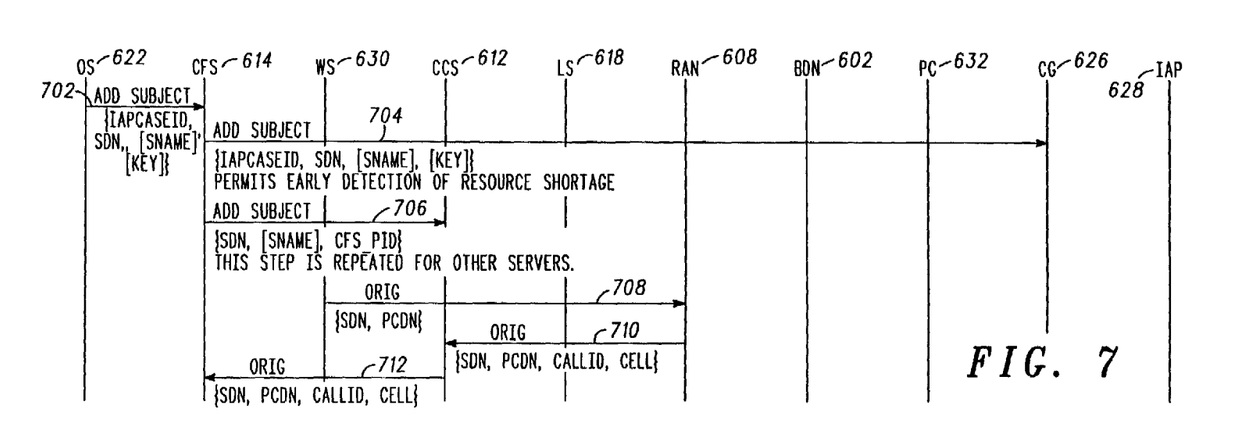
FIGS. 7–10 are call flow diagrams illustrating a method of providing surveillance in a packet data network such as illustrated in FIG. 6.

Upon reception of appropriate authorization from a law enforcement agency, for example, a court order authorizing wiretapping, the operator provisions surveillance of the subject via the operations system. At step 702, the operations server 622 sends the provisioning information to the CALEA Feature Server 614. This includes the CASE ID which identifiers the law enforcement agency and the particular surveillance case. Also included is the subject's identity such as his or her directory number and name. If encryption of the signaling is desired, a key may be distributed to the network entities that will provide surveillance information.

Based on the subscriber and agency information, the CALEA feature server 614 instructs the multicast client function in the appropriate collection gateways 626 to listen for multicast announcements of the identified subject, step 704. This method permits early detection of potential resource shortages in the collection gateway 626. An alternative to this step 704 is for the CALEA feature server 614 to directly assign collection gateway resources when a subject call is answered. Resources may include circuits and multicast bearer and signaling streams.

The CALEA feature server 614 instructs the Call Control Server 612 to add the specified subject to its surveillance list. Any signaling related to the subject will be replicated and sent to the CALEA feature server 614, step 706. An alternative approach to this step 706 is to assign a multicast group (address) for all intercept signaling. The CALEA feature server 614 would be a receiving member of this group. The CALEA feature server 614 also adds the subject to the surveillance list in other servers such as the profile server 620, the mobility server 616, the location server 618, and other feature servers 624.

At step 708, the subject, wireless subject 630, originates a call to a party, participant-C 632, on the circuit switched public network (P-C). The radio access network 608 sends the origination to the call control server 612 for proper further processing, step 710. The call control server 612 recognizes that the origination is a member of the surveillance subjects list and replicates the message to the CALEA feature server 614, step 712. The CALEA feature server 614 collects the call id, source and destination party ids and the cell location required for signaling to the intercept access point 628. The cell id may be used to collect coordinate location information from the location server 618.

Figure 8:
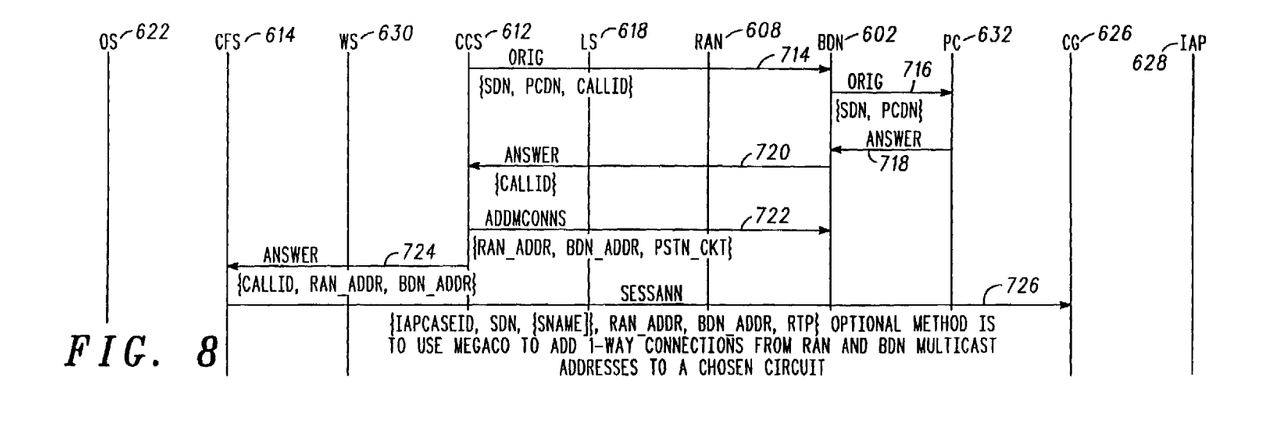

At step 714, the call control server 612 forwards the origination to the bearer distribution network 602 with access to the PSTN 606. The bearer distribution network 602 signals an origination (e.g. IAM) to the participant-C 632 across the public switched telephone network 606, step 716. The terminating party, participant-C answers, step 718, and the answer is forwarded to the call control server 612, step 720.

Noting the call is for a surveillance subject, the call control server 612 assigns multicast addresses for the bearer stream terminations between the radio access network 608 and the bearer distribution network 602. A circuit termination is associated with the streams for delivery of information to/from the participant-C 632.

Figure 9:
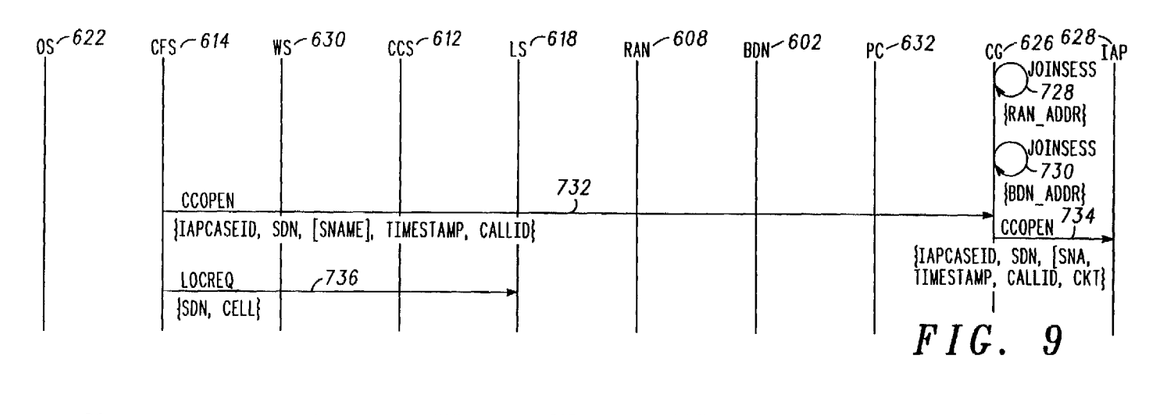

The call control server 612 informs the CALEA feature server 614 of the answer so that that interception by the collection gateway 626/intercept access point 628 may be enabled, step 724. The CALEA feature server 614 performs a proxy announcement (e.g., Service Access Point (SAP)) of the multicast sessions established for the subject communications, step 726. The multicast client in the collection gateway 626 recognizes the announcement is for a session it was earlier instructed, by the CALEA feature server 614, to listen for. It enables reception of the subject's IP datagrams from the radio access network 608, step 728. The multicast client enables reception of the subject's IP datagrams from the bearer distribution network 602, step 730.

The CALEA feature server 614 signals a call content pen instruction to the collection gateway 626, step 732. The subject identity, timestamp, call id, and other required parameters are provided. The collection gateway 626 forwards the open to the intercept access point 628, step 734.

Figure 10:
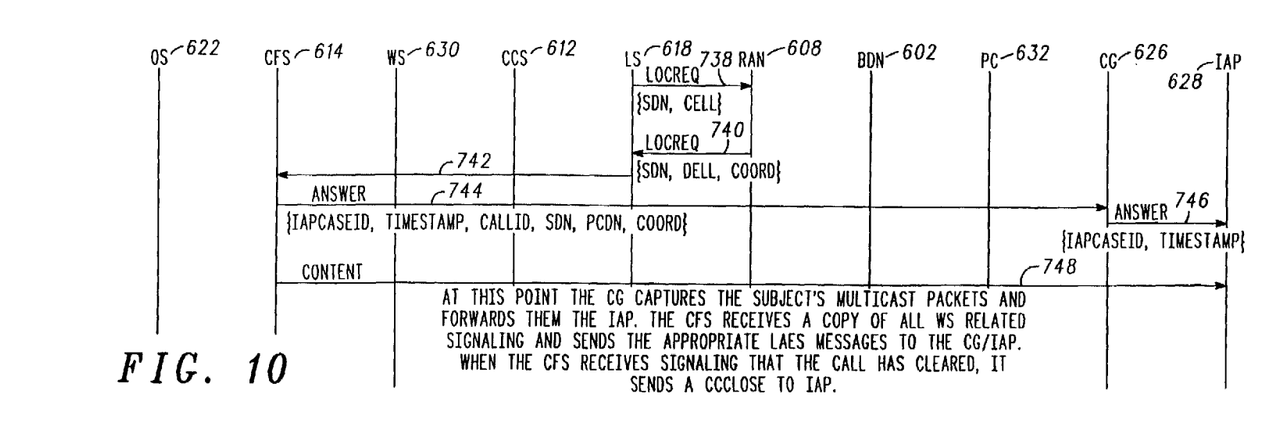

The CALEA feature server 614 requests detailed location information of the subject from the location server 618, step 736. The location server 618 requests updated location information from the radio access network 608, step 738. The radio access network 608 returns the current subject location, step 740. The location server 618 formats and forwards the response to the CALEA feature server 614, step 742.

The CALEA feature server 614 includes the collected location coordinates in an Answer sent to the collection gateway 626. Also included is the CASE ID and all collected information from the call set up signaling, step 744. The collection gateway 626 forwards this to the intercept access point 628, step 746. At this point the collection gateway 626 captures the call content to and from the wireless subject 630 and sends it to the intercept access point 628. Any subject related signaling in the network is forwarded to the CALEA feature server 614, which sends the appropriate signal to the intercept access point 628 as required, step 748.

It will be appreciated that in this embodiment of the invention does not require the signaling entities (e.g., control/feature servers) to replicate signaling since designated intercept parties signaling may utilize one or more known multicast addresses/ports. Use of separate addresses enables wholesale special treatment such as encryption, which might not be done on normal calls. Further still, calls such as mobile-to-mobile calls or PDG do not have to go through the relay client (e.g. relay client 24) or an MCU. It will be further appreciated that the SDU could be incorporated into the radio access network, e.g., into the base transceiver stations of the CDMA cellular communication network.

This embodiment of the invention also enables the use of multicast and signaling related to joining multicast groups. The join may be provided by a multicast client function adapted to the CALEA feature server, which joins the individual's multicast group when it is announced, e.g., via SAP. However, this may not be required since the CALEA feature server, e.g., CALEA feature server 614, can do an MGCP Add of the subject's multicast bearer streams to the circuit (or packet) connection to the intercept access point 628.

Figure 11:
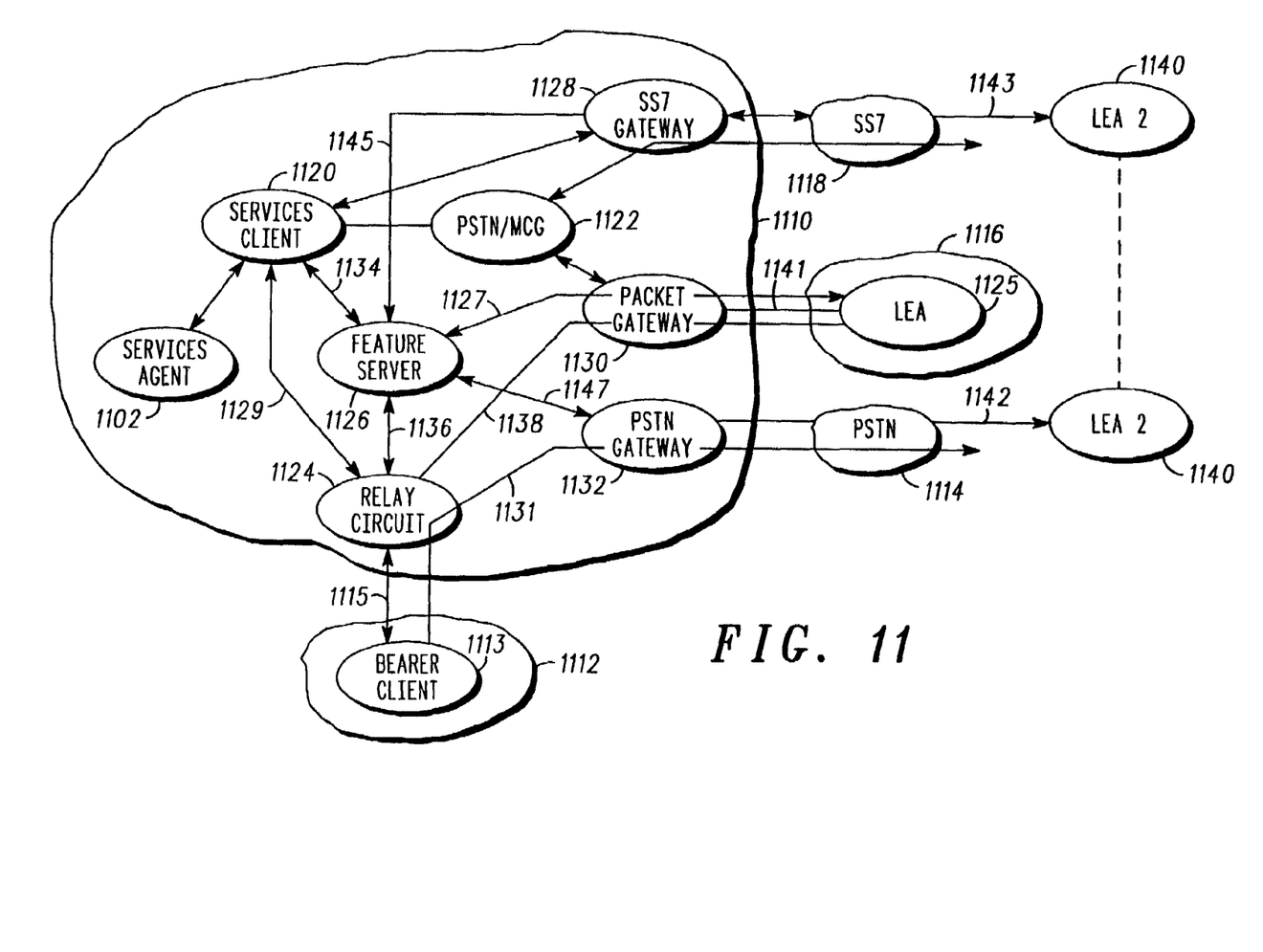
FIG. 11 is a block diagram illustration of a communication network in accordance with yet another preferred embodiment of the invention.

FIG. 11 illustrates a communication network 1100 similar in configuration to that shown in FIG. 1, and like elements are identified using a reference numeral beginning with the number "11." For example, core network 10, in FIG. 1, is shown as core network 1110 in FIG. 11. As shown in FIG. 11, the core network 1110 includes a services agent 1102 that interfaces with the services client 1120. In a preferred embodiment of the invention, the services agent 1102 contains a menu of interception features, such as have been described herein, which can be applied to an intercept order from an authorized LEA. As will be described, the services agent 1102 permits regional variations of intercept requirements to be applied to different targets within a single network using a common equipment design. For a given target and corresponding agency, specific bearer delivery interfaces and event record formats can be selected, simultaneously, within a single network configuration. For example, a single target circuit switched call may be monitored by two LEAs, e.g., LEA 1125 and LEA 1140. For example, LEA 1140 may require a circuit switched interface, e.g., interface 1141, for bearer traffic and a signaling interface, e.g., interface 1143, for signaling information such as TIA J-STD-025 event records. LEA 1125, however, may require a single packet data interface, e.g., interface 1141, for the delivery of both bearer traffic and signaling information such as ETSI EN 201 671 event records. Furthermore, home network based interception is required by many governments in addition to the visited network based interception called out by international standards. In accordance with a preferred embodiment of the invention, the services agent 1102 includes a data structure associated with processing capability. Within the data structure, the services agent 1102 maintains a single target list that permits the services agent 1102 to administer both home network based and visited network based surveillance target interception from a single location. The services agent 1102 may further contain a menu of surveillance features and associated logic, from which requesting agencies may select surveillance features to be associated with a surveillance target upon requesting surveillance services.

The services agent 1102 administers initiation of surveillance services. The services agent 1102 associates a surveillance services requester, for example, a requesting LEA 1125 or 1140, the services requested and a services client associated with the surveillance target, for example, services client 1120. The services agent 1102 locates existing services clients upon receipt of a service request for the surveillance target, or provides the instantiation of a new services client for a surveillance target upon initial attachment of the surveillance target to the network. Within the data structure, the services agent 1102 further maintains the list of intercept features and agency delivery addresses for each surveillance target.

In accordance with preferred embodiments of the invention, the services agent 1102 instructs the services client 1120, or potentially passes appropriate logic to the services client 1120, to gather the appropriate surveillance features from the CALEA feature server 1126 for application against a specific surveillance target and for a specific LEA. Multiple features can be activated against the surveillance target simultaneously. Since the services agent's function locates or creates services clients, there is minimal signaling impact to the system when the intercept target list is integrated into the services agent 1102.

As will be appreciated, this approach combines home and network based interception into a single, unified approach as a home services client is established for a surveillance target even when the surveillance target has roamed into another network. The intercept feature loaded onto the CALEA feature server 1126 will determine the type of interfaces, for example, interfaces 1141, 1142 and/or 1143, used for delivery, and the format of the information delivered. ETSI and TIA standards, as well as custom regional variations are defined as features on the CALEA feature server 1126, and assigned to each target on the services agent 1102. The CALEA feature server 1126 communicates with the appropriate gateways via links 1127, 1145 and/or 1147. Various formats and interfaces for specific agencies can be applied to a single or multiple surveillance target simultaneously.

The invention has been described in terms of several preferred embodiments, which are intended to be illustrative of the broad aspects of the invention. It will be understood that the invention is not limited in scope to the preferred embodiments described herein, but instead is limited only by the scope of the subjoined claims.

We claim:

1. A method for providing surveillance services within a packet data communication network, wherein the communication network includes a bearer distribution network for transport of Internet Protocol (IP) bearer traffic associated with a surveillance target, the method comprising the steps of:
   receiving, by a surveillance server, a request for surveillance services from a requesting agency;
   transmitting, by the surveillance server, a surveillance message to a collection gateway, the surveillance message comprising surveillance information associated with the request;
   transmitting call signaling information to the bearer distribution network; and
   responsive to the call signaling information, directing IP bearer traffic associated with the surveillance target to the collection gateway via the bearer distribution network and without the interposition of the surveillance server, wherein the collection gateway is coupled to an access point being accessible to the requesting agency.

2. The method of claim 1, wherein the surveillance information comprises one of a surveillance feature, a surveillance target identifier, a requesting agency identifier, and a case identifier.

3. The method of claim 1, wherein the call signaling information comprises one of a surveillance target identifier, a timestamp, and a call identification.

4. The method of claim 1, wherein the call signaling information is associated with one of a registration, a call connection, and a service invocation.

5. The method of claim 4, wherein the service invocation comprises one of a call waiting, a conference call, a call forwarding, and a message retrieval.

6. A communication network for providing communication services to a subscriber, wherein the communication network includes a bearer distribution network for transport of Internet Protocol (IP) bearer traffic associated with a surveillance target, the communication network comprising:
   a collection gateway that is interfaced with the bearer distribution network and with a law enforcement agency;
   a surveillance server that is interfaced with the bearer distribution network and the collection gateway, wherein the surveillance server receives a request for surveillance services from a requesting agency, receives signaling related to call set up for a call associated with the surveillance target, and in response to receipt of the signaling, announces the call to the collection gateway and provides surveillance-related signaling information to the collection gateway; and
   wherein the bearer distribution network is responsive to the surveillance server to direct the IP bearer traffic associated with the surveillance target to the collection gateway without the interposition of the surveillance server, which bearer traffic and the surveillance-related signaling information can be accessed by the law enforcement agency via the collection gateway.

7. The communication network of claim 6, wherein the surveillance server is part of a core network.

8. The communication network of claim 7, wherein the core network comprises a feature server, wherein the feature server comprises one of a location server, a mobility server, a profile server, and an operation server.

9. The communication network of claim 8, wherein the location server is interfaced with a radio access network.

10. The communication network of claim 7, wherein the core network comprises a call control server.

11. The communication network of claim 7, wherein the collection gateway is coupled to the core network, and wherein responsive to the surveillance server, the core network directs call signaling information to the collection gateway.

12. The communication network of claim 11 further comprising an access point, the access point being accessible to a requesting agency.

13. In a communication network providing communication services for a subscriber, wherein the communication network includes a bearer distribution network for transport of Internet Protocol (IP) bearer traffic associated with a surveillance target, and wherein a server operates in accordance with a computer program embodied on a computer-readable medium for providing surveillance within the communication network, the computer program comprising:
   a first routine that directs the server to receive a request for surveillance services from a requesting agency;
   a second routine that directs the server to transmit a surveillance message to a collection gateway, the surveillance message includes surveillance information associated with the request; and
   a third routine that directs the server to transmit call signaling information to the bearer information network, wherein responsive to the call signaling information, the bearer distribution network directs the bearer traffic to the collection gateway without the interposition of the surveillance server, and wherein responsive to the surveillance information, the collection gateway directs the bearer traffic to an intercept access point for communication to the requesting agency.

14. The computer program of claim 13, wherein the surveillance information comprises one of a surveillance feature, a surveillance target identifier, a requesting agency identifier, and a case identifier.

15. The computer program of claim 13, wherein the call signaling information comprises one of a surveillance target identifier, a timestamp, and a call identification.

16. The computer program of claim 13, wherein the call signaling information is associated with one of a registration, a call connection, and a service invocation.

17. The computer program of claim 16, wherein the service invocation comprises one of a call waiting, a conference call, a call forwarding, and a message retrieval.

* * * * *